United States Patent
Hooper, Jr.

Patent Number: 5,349,924
Date of Patent: Sep. 27, 1994

[54] ANIMAL KENNEL

[76] Inventor: Eugene J. Hooper, Jr., 1632 Bald Hill Loop, Madison, N.C. 27025

[21] Appl. No.: 29,522

[22] Filed: Mar. 11, 1993

[51] Int. Cl.⁵ .............................. A01K 1/02
[52] U.S. Cl. .................................... 119/19
[58] Field of Search .............. 119/19; 43/54.1; 312/902; 220/524, 549, 676

[56] References Cited

U.S. PATENT DOCUMENTS

| | | | |
|---|---|---|---|
| 315,925 | 4/1885 | Evans | 119/19 |
| 807,196 | 12/1905 | O'Brien | 119/19 |
| 2,897,781 | 8/1959 | Olson | 119/19 |
| 3,219,488 | 11/1965 | Southworth, Jr. | 220/367 X |
| 3,225,738 | 12/1965 | Palencia | 119/17 |
| 3,618,568 | 11/1971 | Breeden | 119/19 |
| 3,791,347 | 2/1974 | Lovell | 119/17 X |
| 4,029,048 | 6/1977 | Gershbein | 119/19 X |
| 4,082,390 | 4/1978 | Gibson et al. | 312/902 X |
| 4,590,885 | 5/1986 | Sugiura | 119/19 |

OTHER PUBLICATIONS

Advertisement, Bill Boatman & Co. Catalogue, Fall 1990, p. 11.
Advertisement, Quail Unlimited, Nov./Dec. 1988, p. 51.
Advertisement, Quail Unlimited, Nov./Dec. 1988, p. 53.

*Primary Examiner*—Robert P. Swiatek
*Attorney, Agent, or Firm*—Griffin Butler Whisenhunt & Kurtossy

[57] ABSTRACT

An animal kennel (10) comprises a removable partition (16) which is inserted into a housing (12) through a partition slot (52) in a rear housing sidewall (22). The removable partition is guided by partition tracks (58, 60) extending between the rear housing sidewall partition slot to be positioned between two door openings (48, 50) in a front housing sidewall (20). A removable drop-in tray (18) can be inserted into a partition lock slot (78) by opening a top door (34) for locking the removable partition in position. The kennel also includes shallow fixed trays (14) having tray sidewalls (68) which are parallel to, but slightly spaced from housing sidewalls, with air, or inlet, ports (72) being in the housing sidewalls adjacent the tray sidewalls. The front doors include vent ports (53) which are defined by outwardly-protruding, funnel-shaped wall portions (53a). Foam (42) is mounted on an interior surface of the top door for impinging on items in the fixed trays when the top door is closed.

17 Claims, 4 Drawing Sheets

ANIMAL KENNEL

BACKGROUND OF THE INVENTION

This invention relates generally to the art of animal containers, or kennels, and more particularly to dog kennels of a type which can be transported in beds of trucks.

A number of transportable dog kennels are currently being used for transporting dogs in beds of trucks. Some such kennels, for example, include wheel-well slots in housings thereof so that the housings can be mounted in truck beds without contacting protruding wheel wells therein. However, there are a number of deficiencies with such prior-art transportable kennels. For example, such transportable kennels are often used by hunters and hunters often take more than one dog with them. Quite often two particular dogs do not "get along" and it is therefore not convenient to transport them together. On the other hand, some dogs behave better when they are transported with particular other dogs. Most existing transportable kennels either have a single interior space or a fixed number of separated interior subspaces. Thus, it is an object of this invention to provide an animal kennel, particularly a transportable animal kennel, having an interior space which can be selectively divided into a plurality of interior subspaces, or left as one large space, as desired.

It has been suggested to construct an animal kennel, or container, with at least two front doors with a slot between the doors for receiving a removable partition for dividing an interior space of the kennel into two subspaces, each subspace being served by one of the doors. For example, U.S. Pat. No. 3,225,738 to Palencia describes such an animal cage. However, it has been found that such a slot in a front wall between two doors unduly weakens the kennel, or cage, so that such a kennel is not suitable to be often lifted into and out of a truck bed. That is, such a cage does not have adequate support so that it vibrates too much and/or is not sufficiently durable. Thus, it is an object of this invention to provide an animal kennel, particularly a transportable animal kennel, which can be selectively divided into a plurality of interior subspaces, or left as one space, as desired, but yet which is also quite sturdy and durable.

Yet another difficulty with prior-art kennels having removable partitions is that the partitions can inadvertently slide out of their dividing positions. This is not only a problem from the point of view of not keeping animals separated, but also can injure animals as partitions slide back and forth. Further, this can also result in the loss of slidable partitions should they slide out the backs of trucks, thus endangering vehicles driving behind. Therefore, it is an object of this invention to provide a selectively dividable animal kennel having a removable partition, with the partition being positively and reliably locked in position so that it cannot move, but yet, if it is inadvertently not locked in position and slides out of the kennel, it will be prevented from sliding too far by a cab of the truck and, therefore, from falling from the truck bed onto the street.

Yet another difficulty with some prior-art transportable animal kennels is that they do not provide sufficient ventilation for animals housed therein and/or the ventilation they do provide is dangerous for the animals. In this regard, animals housed in small kennels often concentrate on vent openings, shoving their noses against them and often gnawing the edges thereof. In doing this, animals sometimes injure their noses and, of course, damage the kennels at the vent openings. Thus, it is an object of this invention to provide an animal kennel which provides sufficient ventilation with ventilation holes whose defining edges do not injure noses of animals and are difficult for the animals to gnaw.

Similarly, many such transportable kennels do not have vent ports properly positioned for creating sufficient air circulation into interior compartments thereof. Therefore, it is an object of this invention to provide an animal kennel having vent ports positioned for creating sufficient air circulation within interior spaces of the kennel.

Some prior-art transportable kennels have top doors for accessing shallow trays at the tops of the kennels. Although the top doors and shallow trays have provided a good storage area for various items, they have not been satisfactory for storing guns, ammunition and the like, because these items have been free to move, or bounce, therein, so that they could be damaged. For this reason it is a further object of this invention to provide an animal kennel having a top door for accessing shallow trays at a top of the kennel which can be used for carrying sensitive items, such as guns, shells and the like.

A related problem is that the prior-art shallow trays, have not been practical for hauling much of the equipment which hunters often take with them. For example, such trays can usually not be used for boots and other large items of clothing. Similarly, such trays cannot be used for ice and drinks. It is desirable for hunters to have a single unit which can be used for hauling standard hunting gear so that hunters can more easily pack for a hunting trip. Therefore, it is an object of this invention to provide a larger tray for a transportable kennel which can be accessed from a top door.

A difficulty encountered in trying to provide a larger tray to be accessed from a top door in a hunting dog kennel is that such a tray limits access to the interior space of the hunting kennel. Therefore, it is an object of this invention to provide such a larger tray while not unduly limiting access to the interior space of the dog kennel.

Yet another difficulty with many prior-art transportable dog kennels is that they become easily soiled and are difficult to clean. Therefore, it is an object of this invention to provide a transportable dog kennel which does not become easily soiled and is extremely easy to clean.

It is a further object of this invention to provide a transportable dog kennel which is relatively inexpensive to construct.

SUMMARY

According to principles of this invention, an animal kennel has a removable partition which is insertable from a partition slot in a rear housing sidewall of the kennel. The housing defines a partition track extending between the rear housing sidewall partition slot and a front housing sidewall. In one embodiment of the invention, the housing includes a top door for accessing an interior space of the housing and the removable partition includes a partition lock slot. Further included is a locking member which can be dropped into the partition lock slot via the top door for locking the partition in position to divide the interior space into subspaces. In a preferred embodiment, the locking member is a removable drop-in tray for storage.

In a particularly beneficial embodiment, the kennel further includes fixed trays immediately below the top door having tray sidewalls which are close to, but spaced from housing sidewalls, there being inlet air ports in the housing sidewalls adjacent the tray sidewalls so as to allow the passage of air without giving animals access to the air ports on which they may injure themselves.

Also, in one embodiment, front doors of the kennel housing include vent ports which are defined by funnel-shaped edges protruding outwardly from the interior space. This also prevents animals in the interior space from injuring their noses on sharp edges and from chewing on the edges.

In yet another embodiment, the top door includes foam on an interior surface thereof for impinging on items in the fixed trays when the top door is closed to hold items in the fixed trays.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

A dog transport box, or transportable kennel, 10 comprises a housing 12, fixed shallow trays 14, a removable partition 16, and a removable drop-in tray 18.

Figure 8:
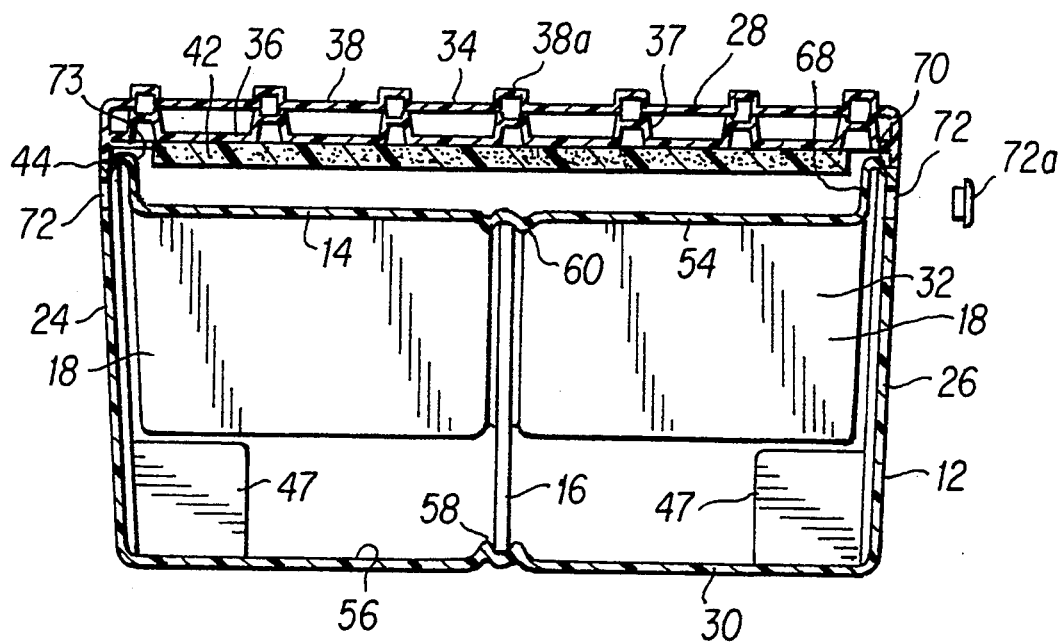
FIG. 8 is a sectional view taken on line VIII-VIII in FIG. 2, with an air-port cover being shown thereon exploded from an air port of a right sidewall thereof.
Figure 9:
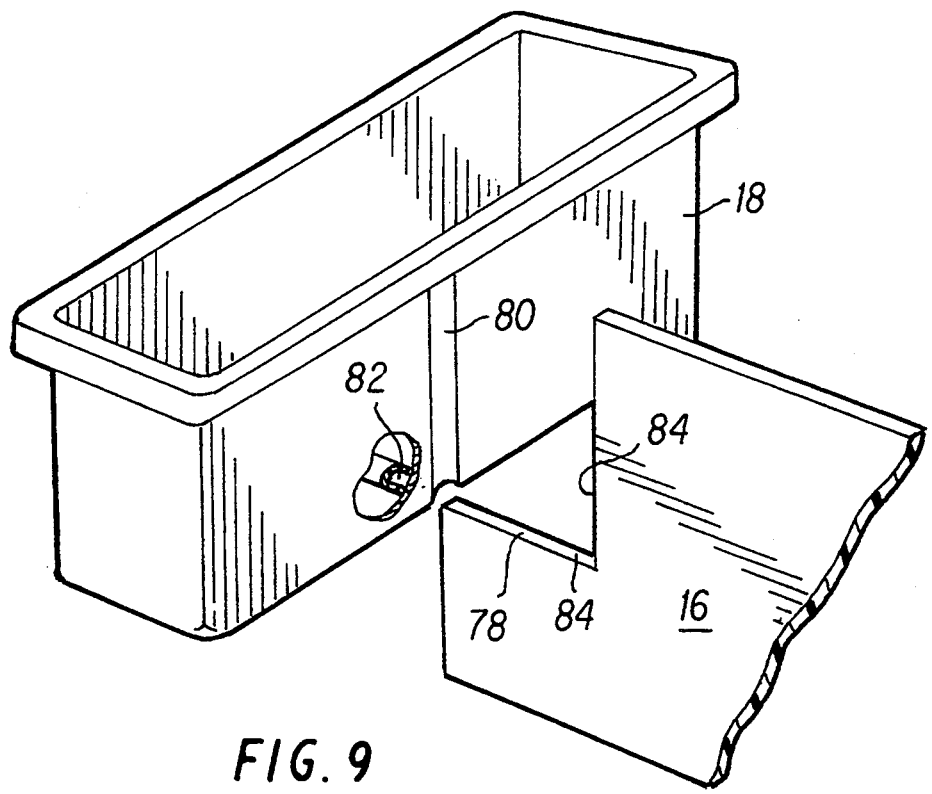
FIG. 9 is a segmented isometrical exploded view of a removable drop-in tray and a removable partition of the transportable dog kennel of the other drawings, both elements being partially cut away in FIG. 9.

The housing 12 has front, rear, left, and right housing sidewalls 20, 22, 24, and 26 (referred to as a unit as the housing sidewall) as well as a top housing wall 28 and a bottom housing wall 30, all of which define an interior space 32 as can be seen in FIG. 8. The top housing wall 28 is formed by a hinged top door 34 which is hollow, having a door interior wall 36 and a door exterior wall 38. The interior wall 36 has multiple reinforcing indentations 37 therein which tie the door exterior wall 38 to the door interior wall 36 so as to form the hinged top door 34 into a rigid, but yet light-weight, structure. These reinforcing indentations 37 are also used to abut a door prop 37a. The door exterior wall 38 includes ribs 38a thereon which also contribute to rigidity of the top door 34. The top door 34 is rotatable about three hinges 40 mounted on the rear housing sidewall 22 of the housing 12. The door interior wall 36 has a compressible, or flexible, polymeric foam, or foam rubber, 42 mounted on, or adhered to, a surface thereof which faces the interior space 32 of the housing 12 when the top door 34 is closed. The purpose of this foam rubber will be explained below- The top door 34 has a downwardly directed door edge 44 about its periphery which mates with an upper ledge 45 of the housing sidewall in such a manner as to prevent water from entering the interior space 32 in case of rain.

The left and right housing sidewalls 24 and 26 respectively have wheel-well slots 46, formed by wheel-well-slot walls 47, therein which are similarly, but oppositely, positioned on opposite left and right sides of the housing 12 to leave spaces for truck bed wheel wells which protrude into the truck beds so that these wheel wells do not interfere with positioning the transportable kennel in a truck bed.

Figure 1:
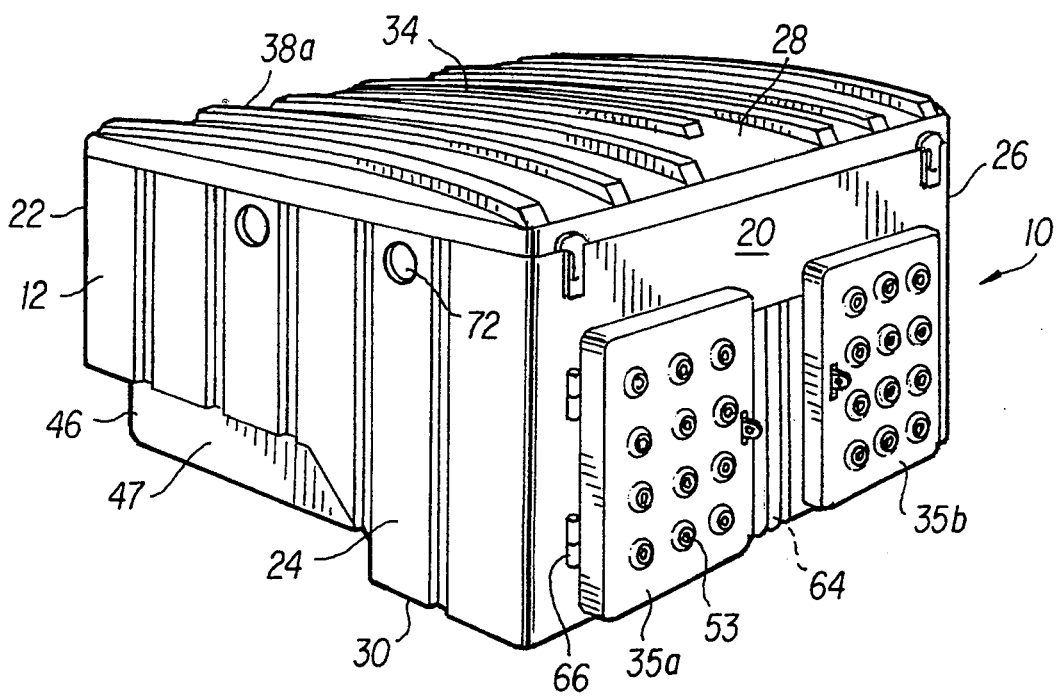
FIG. 1 is an isometric view of a transportable dog kennel of this invention.
Figure 4:
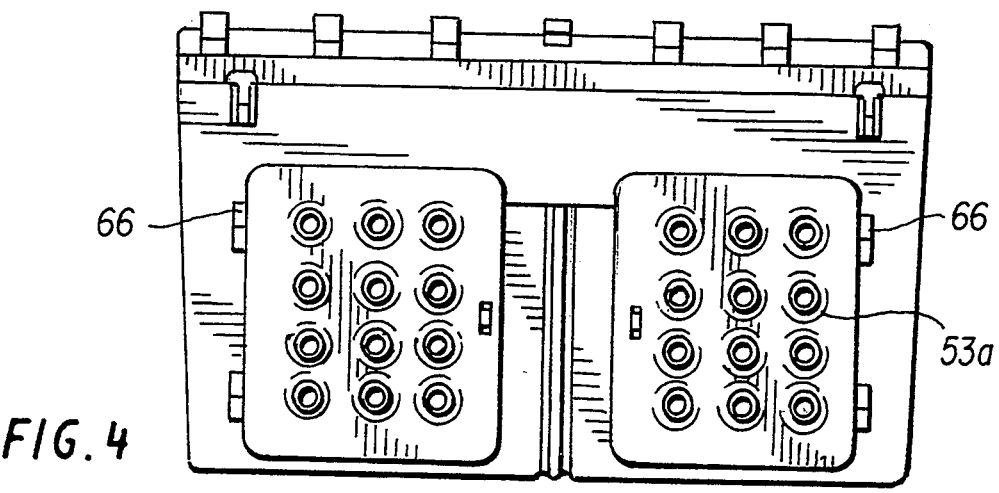
FIG. 4 is a front elevational view of the transportable dog kennel of FIG. 1.
Figure 5:
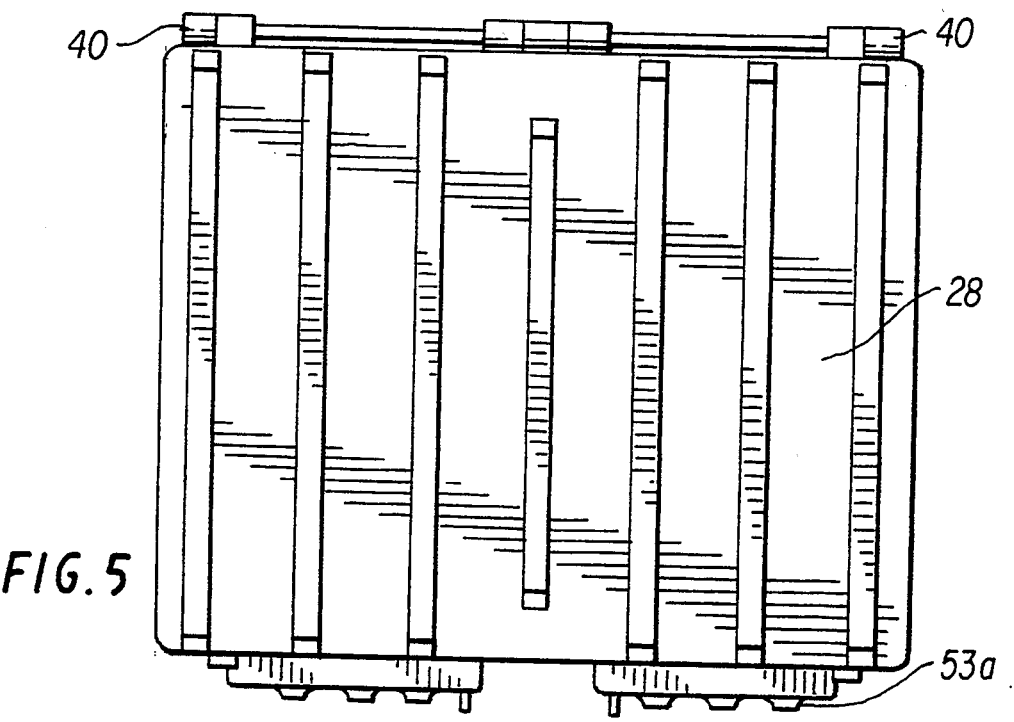
FIG. 5 is a top plan view of the transportable dog kennel of FIG. 1.
Figure 6:
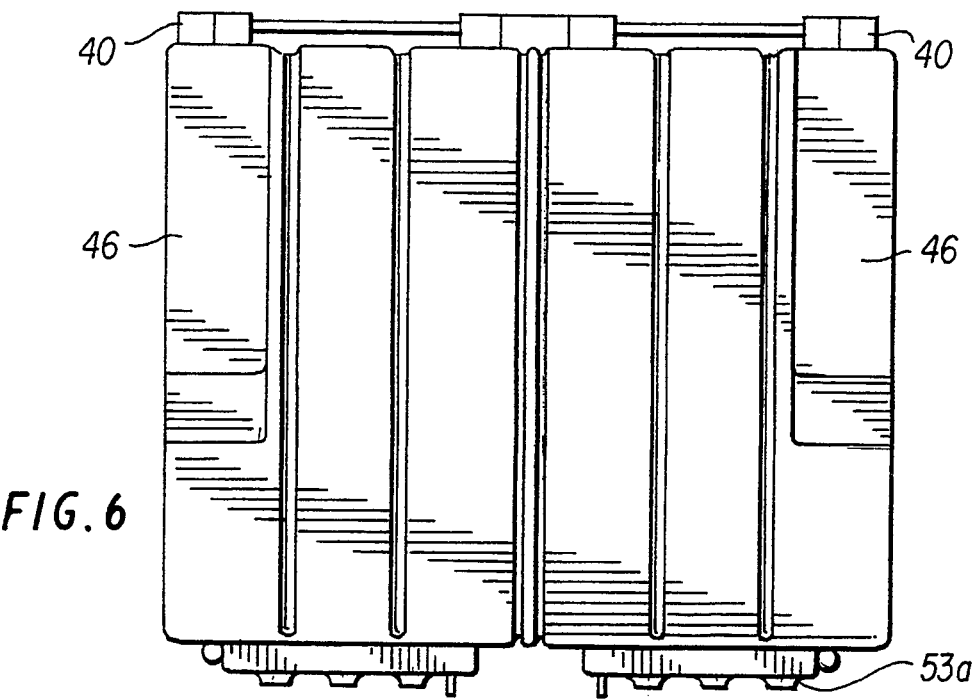
FIG. 6 is a bottom plan view of the transportable dog kennel of FIG. 1.

The front housing sidewall 20 defines left and right door openings 48 and 50 and the rear housing sidewall 22 defines a vertical partition slot 52 therein. The left and right door openings 48 and 50 can respectively be covered by hinged doors 35a and 35b which are mounted on the front housing sidewall 20. The hinged doors 35a and b have outflow vents 53 formed therein by outwardly extending and converging funnel-shaped wall portions 53a. The vertical partition slot 52 extends between the bottom wall 30 and the top wall 28. In this regard, the partition slot 52 does not extend completely to the top wall 28 but rather only to a bottom fixed-tray wall 54 which can be seen in FIG. 8. An interior surface 56 of the bottom wall 30 defines an elongated partition bottom track 58 and an interior surface of the bottom fixed-tray wall 54 forms an elongated partition top track 60. These two elongated tracks are parallel to one another and each extends from the partition slot 52 in the rear housing sidewall 22 toward the front housing sidewall 20. The partition bottom and top tracks 58 and 60 receive the removable partition 16 when it is inserted into the partition slot 52 for guiding a leading edge 62 thereof to be positioned between the left and right door openings 48 and 50 in an interiorly directed slot (whose shape can be discerned from the exterior shape of the front housing sidewall 20 shown in FIGS. 1, 4 and 7) 64 of the front housing sidewall 20. In this position, the removable partition 16 divides the interior space 32 into two subspaces, each being served by only one of the door openings 48 and 50.

The left and right front doors 35a and 35b are pivotally connected to the front housing sidewall 20 by hinges 66 to open and close the left and right door openings 48 and 50. The fixed shallow trays 14, as can be seen in FIG. 8 are molded as one piece with the left, right and front housing sidewalls 24, 26 and 20. That is, the fixed shallow trays are comprised of the single bottom fixed-tray wall 54, tray sidewalls 68 and various divider walls; and, as can be seen in FIG. 8, upper edges 70 of the tray sidewalls 68 are molded with upper edges of the left, right and front housing sidewalls 24, 26 and 20 to form one piece therewith. Further, the tray sidewalls 68 are spaced about ¾ inch from the left, right and front housing sidewalls 24, 26 and 20. In this regard, the left and right housing sidewalls 24 and 26 have air, or inlet, ports 72 therein adjacent the tray sidewalls 68. Thus, a dog within the interior space 32 cannot reach, with his nose or paws, the air ports 72, because they are protected, or overlapped, by the tray sidewalls 68; however, air can flow into the interior space 32 through the air ports 72.

Regarding the air ports 72, the transportable kennel 10 also includes snap-in air-port covers 72a (see FIG. 8) which can be removed from, or snapped into, the air ports 72. Thus, a hunter can choose a desired number of air ports 72 to be open, depending on weather conditions (summer/winter). Again, since dogs in the interior space cannot get to the air ports 72, they cannot knock the air-port covers 72a out of them.

Figure 7:
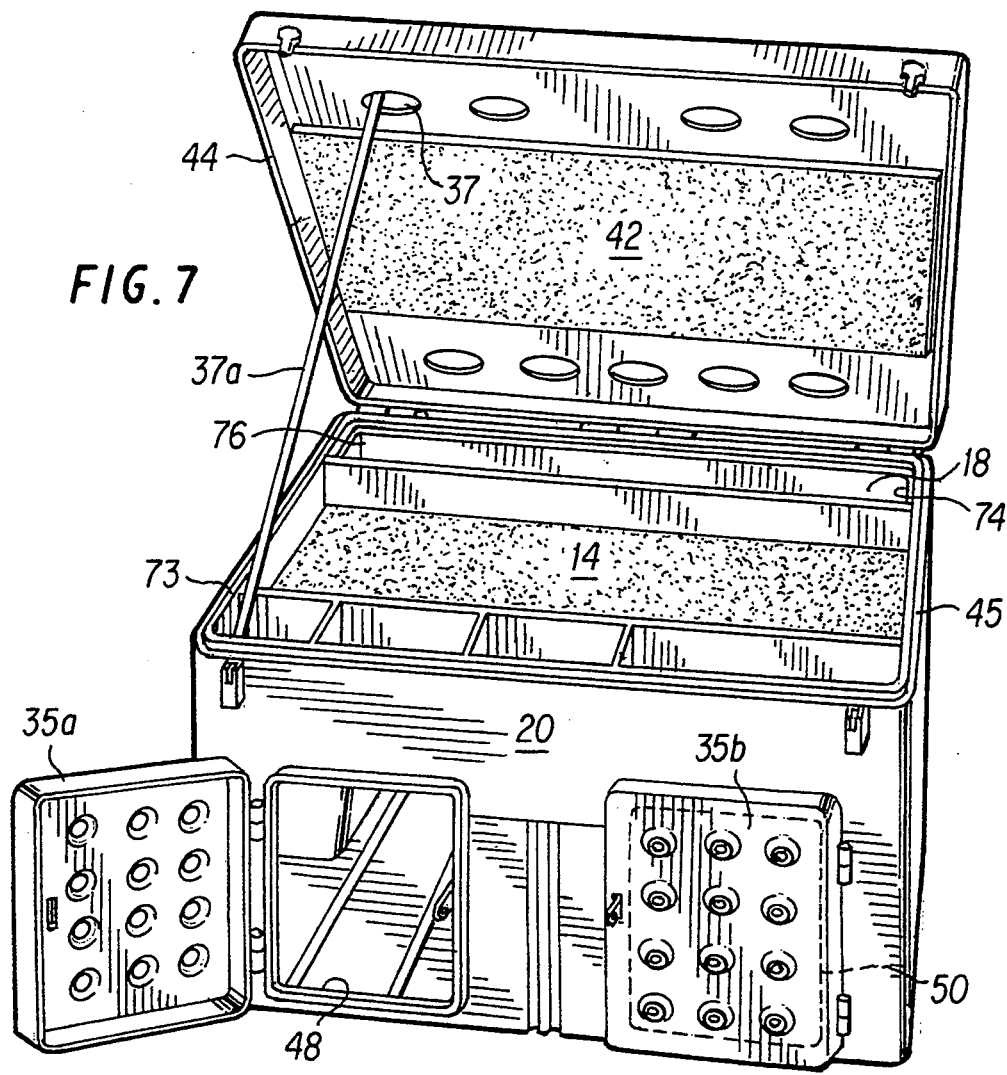
FIG. 7 is an isometric view of the transportable dog kennel of FIG. 1 with a top door thereof being propped open and a front door thereof being open.

The upper edges 70 of the tray sidewalls 68 and the left, right, front and rear housing sidewalls 24, 26, 20 and 22 have very particular shapes, as can be seen in FIGS. 7 and 8, in that they form the ledge 45 on which the door edge 44 rests, but inwardly from the ledge 45 they rise upwardly to form an upward ridge 73 so that water which gets between the door edge 44 and the ledge 45 cannot enter the interior space 32, because it cannot get over this upward ridge 73. The removable drop-in tray 18 drops into a space, or gap, 74 which is left uncovered by the fixed shallow trays 14; that is, the fixed shallow trays 14 extend to the front housing wall 20, however, they do not extend to the rear housing sidewall 22, so that there is the gap 74 between a rear edge 76 of the fixed shallow trays 14 and the rear housing sidewall 22. The removable drop-in tray 18 is sized to fit into this gap and to extend downwardly into the interior space 32, as is shogun in FIG. 8, resting on the wheel-well-slot walls 47. Similarly, the removable partition 16 has a partition lock slot 78 therein which approximately fits the shape of the removable drop-in tray 18 so that when the removable partition 16 is fully inserted, with its leading edge 62 in the slot 64 formed by the front housing sidewall 20, the removable drop-in tray 18 can be inserted behind the fixed shallow trays 14 into the partition lock slot 78 of the removable partition 16 for locking the removable partition 16 in place. The removable drop-in tray 18, likewise, has tray lock slots 80 and 82 respectively on its front and bottom walls for interlocking with edges 84 of the partition lock slot 78. Thus, the removable drop-in tray 18 reliably locks the removable partition 16 in place in the interior space 32 of the housing 12 to divide the interior space 32 into two compartments, each serviced by a door 35a, 35b. However, the walls of the removable drop-in tray 18 do not have holes in them, thus, this tray can be used for holding ice without fear of getting water in an area occupied by dogs.

In construction, almost all of the parts of the transportable kennel 10 are molded of a high density plastic. In this respect, the housing sidewalls 20–26, top and bottom housing walls 28 and 30 and the fixed trays 14 are molded as one piece of a durable, high-density plastic, such as polyethylene. Similarly, the top door 34 is molded as one piece including both interior and exterior walls 36, 38. Also, the left and right front doors 35a and 35b are each molded as one piece. Of course, the foam rubber 42 is added to the top door 34 by being adhered thereto after the other portions of the top door are molded. The removable drop-in tray 18 is molded separately as one piece, also of a hard, high-density plastic, and the removable partition 16 can be molded of a high-density plastic or constructed of press board.

Metallic fixtures, such as hinges, snaps and locks, are fastened to the molded parts by appropriate fasteners.

As mentioned above, the removable drop-in tray 18 rests on walls 47 forming the wheel-well slots 46, as can be seen in FIG. 8.

Figure 2:
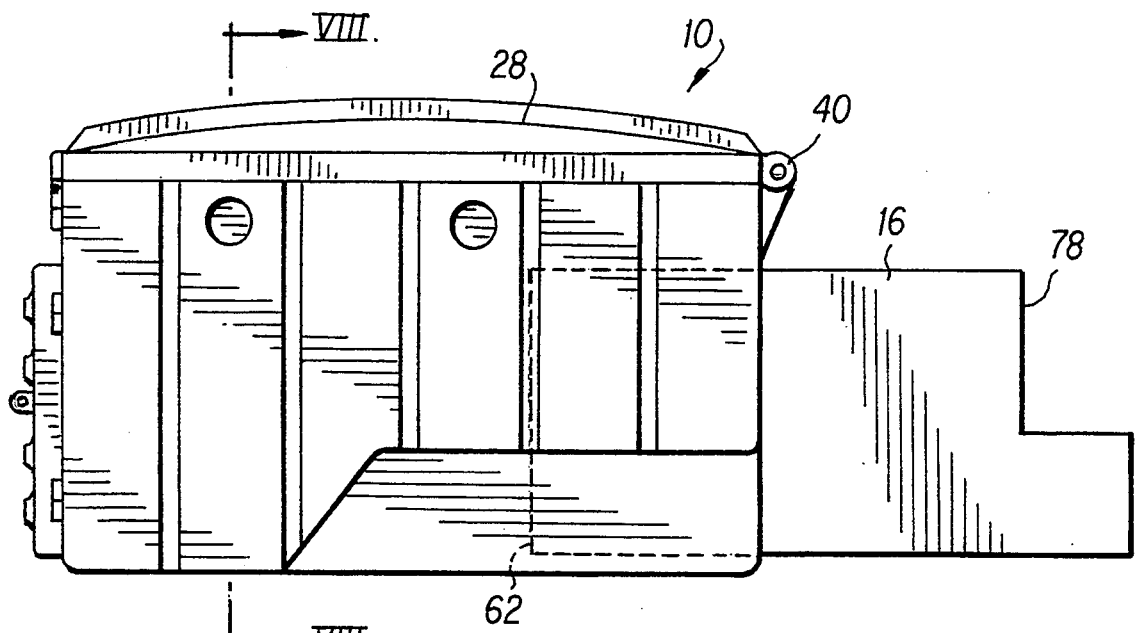
FIG. 2 is a side elevational view of the transportable dog kennel of FIG. 1 with a removable drop-in tray (not shown in FIG. 2) thereof being removed and a removable partition being partially pulled out.
Figure 3:
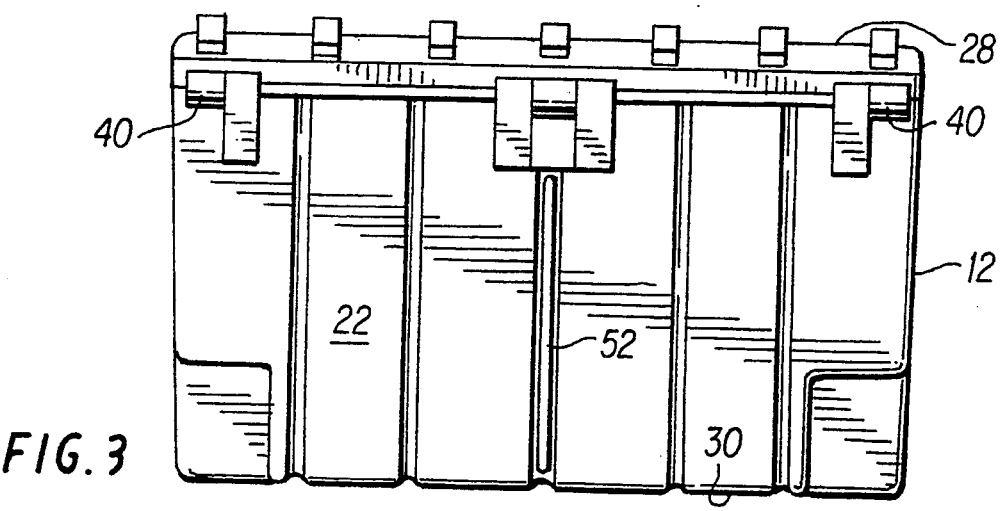
FIG. 3 is a rear elevational view of the transportable dog kennel of FIG. 1.

In operation, the transportable kennel 10 is placed in a bed of a truck with the front housing sidewall 20 actually facing the rear of the truck and the rear housing sidewall facing the front of the truck. However, before this is done, a user, usually a hunter must decide if he wishes dogs to be transported with the transportable kennel 10 divided into separate, smaller, interior subspaces or a common large interior space. If the hunter decides, for example, that the animals should be separated, before placing the transportable kennel 10 in the bed of the truck he opens the top door 30, removes the removable drop-in tray 18, inserts the removable partition 16 into the partition slot 52 from the back of the housing 12, as shown in FIG. 2, drops the removable drop-in tray 18 into the space 74, and thereby into the partition lock slot 78, and closes the top door 34. As mentioned above, he then places the transportable kennel 10 into the bed of the truck, facing toward the rear of the truck. Normally, the hunter will wish to transport guns, ammunition, and other gear in the fixed shallow trays 14 and the drop-in tray 18. To do this, he opens the top door 34 and places the materials in the trays. Guns would be placed in a fixed tray immediately under the foam rubber 42. The top door 34 is then closed so that the foam rubber 42 clamps the guns in the fixed shallow tray so that they do not move therein and, therefore, cannot be damaged by bumping of the truck.

The left and right front doors and the doors 35a and 35b are used to place dogs in individual compartments within the interior space 32 so that they can be driven to a new location at which the left and right front doors 35a and 35b are again opened to let them out. During travel, a negative pressure is caused outside of the vent, or outflow, ports 53. Thus, during transportation, there is a circulation of air into the air ports 72 through the interior space 32 and out through the vent ports 53 of the left and right front doors 35a and 35b.

It is helpful that the air ports, or inlets, 72 are so high, because in this manner they are usually above sidewalls of truck beds and can pick up fresh air without sand and/or dust that may be present at lower levels in truck beds.

This invention is particularly practical in that it allows a hunter to transport dogs either in a common interior space or in separated compartments without a great deal of preparation therefor. Further, the removable partition that is used for this, is reliably locked in position by the removable drop-in tray which, in and of itself, is a great benefit in that it can be used for transporting ice, boots, clothing and the like. The fact that the tray can be removed makes it especially useful, because things, such as water and ice, can be easily dumped from it. Also, it can be removed to carry its contents to remote locations by foot. Further, it can be removed to gain better access for cleaning the interior space 22.

Another advantage of this invention is that the air inlet ports 72 cannot be accessed by dogs from the interior space 32, because they are protected by spaced tray sidewalls 68. Thus, the dogs cannot chew on edges defining the air inlet ports 72 nor can they injure their noses thereon. Further, dogs cannot knock out air-port covers which can cover the air ports 72. Similarly, the funnel-shaped outlet vent wall portions 53a which are directed outwardly from the interior space 32, do not offer sharp edges for dogs in the transportable kennel, and therefore do not allow dogs to chew edges and do not injure dogs noses.

Since most of the housing 12 is molded as one part, it can be made to have rounded edges so that it can be easily cleaned and does not catch dirt in corners. Further, since the entire housing is made primarily of a hard plastic, it does not absorb liquid or excrement and also, therefore, can be easily cleaned.

By placing foam on an interior surface of the top door adjacent a fixed shallow tray, the transportable kennel becomes an excellent gun carrier which clamps guns for transport.

The construction of the upper ridge 45 of the sidewalls provides the transportable kennel with a rainproof seal lid construction so that rain cannot get into the interior of the transportable kennel between the top door 34 and the various housing sidewalls.

Since the transportable kennel is primarily of plastic, there is little rust or corrosion involved therewith.

The double wall top door 34, with the foam rubber thereon provides excellent insulation for the interior space 32 against heat from the sun. Also, the removable air-port covers 72a allow a hunter to regulate the temperature in the interior space 32 to some extent.

Similarly, it is beneficial that the top door 34 is hollow and that almost the entire kennel is made of plastic, because in this manner the kennel can be made to be quite light so that it can actually be loaded into a truck by one person.

It is particularly beneficial that the removable partition 16 is insertable through a partition slot 52 in the rear housing sidewall 22, because in this manner the front housing sidewall 20, which already has two openings 48 and 50 therein, is not unduly weakened by an additional partition slot. Further, this serves as a safety feature in that, if one should place the partition 16 in the housing 12 and forget to insert the removable drop-in tray 18 into the partition lock slot 28, the partition 16 could not inadvertently slide out the back of the truck, but rather would be inhibited from doing this by the cab of the truck.

Yet another benefit of this invention is that edges forming the outwardly-protruding, funnel-shaped vent ports are only on doors thereof. In this regard, it is difficult to mold such shapes on items as complicated as the rest of the housing; however, one can achieve these shapes on the doors since they are molded separately.

While the invention has been particularly shown and described with reference to a preferred embodiment, it will be understood by those of ordinary skill in the art that various changes in form and detail may be made therein without departing from the spirit and scope of the invention.

For example, in one embodiment, the foam 42 is also placed within one of the fixed shallow trays 14 and, in fact, this is shown in FIG. 7.

Also, in one embodiment, not shown, there are air ports 72 included on the rear housing sidewall 72 which are shielded from contact with dogs in the interior space 32 by walls of the removable drop-in tray 18.

The embodiments of the invention in which an exclusive property or privilege are claimed are defined as follows:

1. An animal kennel comprising:
a generally rectangular housing having front, rear, left and right housing sidewalls and top and bottom walls for defining an interior space, wherein said front sidewall defines at least two door openings and comprises at least two front doors covering said door openings, said rear wall defines a partition slot opening through said rear wall, said slot extending between said top and bottom walls, said housing further defining a partition track extending between said rear housing sidewall partition slot opening and said front sidewall between said doors;
a removable partition being of a size for being inserted from outside said housing through said partition slot opening into said interior space and for sliding along said partition track to be guided by said partition track to extend between said front and rear housing sidewalls and thereby divide said interior space into two subspaces, each serviced by only one of said doors.

2. An animal kennel as in claim 1 wherein said top wall comprises a top door for accessing said interior space, wherein said removable partition has a partition lock slot therein and wherein is further included a removable drop-in locking member which can be inserted into said partition lock slot by opening said top door to thereby lock said removable partition in position for dividing said interior space.

3. An animal kennel as in claim 2 wherein said locking member is a removable drop-in tray for storage.

4. An animal kennel as in claim 3 wherein said drop-in tray includes a locking slot for receiving said removable partition.

5. An animal kennel as in claim 3 wherein is further included a shallow fixed tray and wherein said shallow fixed tray is shallower than said drop-in tray and is affixed to at least one of said housing sidewalls.

6. An animal kennel as in claim 5 wherein said fixed tray has tray sidewalls which are close to, but spaced from, said housing sidewalls and wherein said housing sidewalls have an air port therein positioned adjacent said tray sidewalls, whereby said air port allows air into said interior space, but animals in said interior space do not have access to edges defining said air port.

7. An animal kennel as in claim 6 wherein said at least two front doors include vent ports therein which are defined by funnel-shaped edges to protrude outwardly from said interior space.

8. An animal kennel as in claim 7 wherein there is foam on an interior surface of said top door for impinging on items in said fixed tray when said top door is closed to hold said items against movement in said fixed tray.

9. An animal kennel comprising a generally rectangular housing having front, rear, left and right housing sidewalls and top and bottom walls for defining an interior space, wherein said front sidewall comprises at least one front door;
a tray formed as one piece with said housing, said tray having a tray sidewall formed as an extension of one of said housing sidewalls which doubles back close to and approximately parallel to said one housing sidewall;

wherein said one housing sidewall has an air port therein positioned adjacent to said tray sidewall, whereby said air port allows air into said interior space, but an animal in said interior space does not have access to sidewall edges defining said air port.

10. An animal kennel as in claim 9 wherein said door has vent ports therein.

11. An animal kennel as in claim 10 wherein edges forming said vent ports on the said door are funnel shaped to protrude outwardly.

12. An animal kennel as in claim 9 wherein is further included a removable air-port cover for selectively covering said air port.

13. An animal kennel comprising:
a generally rectangular housing having front, rear, left and right housing sidewalls, and top and bottom walls for defining an interior space, wherein one of said sidewalls and walls comprises at least one door;
wherein said housing has air holes therein, said air holes being defined by wall portions which are funnel-shaped to converge as they protrude outwardly, away from said interior space.

14. An animal kennel as in claim 13 wherein air holes on said at least one door are defined by said funnel-shaped wall portions and said wall portions also curve radially outwardly.

15. An animal kennel as in claim 14 wherein there are air holes on said housing which are not on a door which are not defined by funnel-shaped wall portions.

16. An animal kennel comprising:
a generally rectangular housing having front, rear, left and right housing sidewalls and top and bottom walls for defining an interior space, wherein said front sidewall comprises at least one front door and wherein said top wall comprises at least one top door;
a shallow fixed tray mounted on said housing sidewalls to be located in said interior space said shallow tray being formed as one piece with said sidewalls and having tray sidewalls formed as extensions of said housing sidewalls and which double back close to and approximately parallel to said housing sidewalls, said upper edges of said housing sidewalls also defining ledges for interfacing with downwardly directed edges of said top door and said upper edges further defining upwardly directed ridges inwardly spaced from said ledges for preventing water from flowing into said interior space from said ledges;
foam adhered to an interior surface of said top door for impinging on items located in said fixed tray when said top door is closed to hold said items in said fixed tray.

17. An animal kennel as in claim 16 wherein is further included a removable drop-in tray which can be accessed through said top door.

* * * * *

UNITED STATES PATENT AND TRADEMARK OFFICE
CERTIFICATE OF CORRECTION

PATENT NO. : 5,349,924

DATED : Sep. 27, 1994

INVENTOR(S) : Eugene J. Hopper, Jr.

It is certified that error appears in the above–identified patent and that said Letters Patent are hereby corrected as shown below:

On the title page:
The spelling of the inventor's name is corrected throughout the application to be "Eugene J. Hopper, Jr."

Signed and Sealed this

Fifteenth Day of November, 1994

Attest:

BRUCE LEHMAN

*Attesting Officer*     *Commissioner of Patents and Trademarks*